US009534164B2

(12) United States Patent
Al-Subhi et al.

(10) Patent No.: US 9,534,164 B2
(45) Date of Patent: Jan. 3, 2017

(54) CEMENT OIL-BASED MUD SPACER FORMULATION

(71) Applicant: Saudi Arabian Oil Company, Dhahran (SA)

(72) Inventors: Mohammad Lafi Al-Subhi, Dhahran (SA); Scott Steven Jennings, Dhahran (SA); Ahmad Saleh Al-Humaidi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 803 days.

(21) Appl. No.: 13/650,451

(22) Filed: Oct. 12, 2012

(65) Prior Publication Data

US 2013/0092376 A1 Apr. 18, 2013

Related U.S. Application Data

(60) Provisional application No. 61/546,317, filed on Oct. 12, 2011.

(51) Int. Cl.
*C09K 8/40* (2006.01)

(52) U.S. Cl.
CPC .................................... *C09K 8/40* (2013.01)

(58) Field of Classification Search
CPC ..................................................... C09K 8/40
See application file for complete search history.

(56) References Cited

U.S. PATENT DOCUMENTS

| | | | | |
|---|---|---|---|---|
| 3,850,248 A * | 11/1974 | Carney | C09K 8/424 | 166/291 |
| 4,301,016 A * | 11/1981 | Carriere | C09K 8/24 | 507/119 |
| 4,423,781 A * | 1/1984 | Thomas | 166/312 | |
| 4,445,575 A * | 5/1984 | Perkins | E21B 33/13 | 166/285 |
| 5,360,787 A * | 11/1994 | Bloys et al. | 507/124 | |
| 5,552,377 A | 9/1996 | Kindred | | |
| 5,789,352 A * | 8/1998 | Carpenter | C09K 8/601 | 166/291 |
| 5,989,336 A * | 11/1999 | Carpenter et al. | 106/811 | |
| 6,194,354 B1 | 2/2001 | Hatchman | | |
| 7,007,754 B2 | 3/2006 | Fanguy, Jr. et al. | | |
| 7,143,827 B2 | 12/2006 | Chatterji et al. | | |
| 7,549,474 B2 | 6/2009 | Valenziano et al. | | |
| 2001/0022224 A1 | 9/2001 | Haberman | | |
| 2008/0280786 A1* | 11/2008 | Reddy et al. | 507/104 | |
| 2009/0099047 A1* | 4/2009 | Cunningham et al. | 507/207 | |
| 2010/0044057 A1 | 2/2010 | Dealy et al. | | |
| 2010/0243236 A1* | 9/2010 | Koons | 166/177.4 | |

FOREIGN PATENT DOCUMENTS

| | | |
|---|---|---|
| CN | 101921580 B | 9/2011 |
| EP | 0079997 B1 | 1/1986 |
| EP | 0207536 A1 | 1/1987 |
| EP | 0273471 B1 | 8/1992 |
| WO | 2006/120151 A2 | 11/2006 |

OTHER PUBLICATIONS

"16 Compatibility of wellbore fluids"; Recommended Practice for Testing Well Cements; API Recommended Practice 10B-2; American Petroleum Institute; 2005.*

PCT Notification of Transmittal of the International Search Report and the Written Opinion of the International Searching Authority, or the Declaration; dated Jan. 22, 2013; International Application No. PCT/US2012/059636; International File Date: Oct. 11, 2012.

* cited by examiner

*Primary Examiner* — Angela M DiTrani
*Assistant Examiner* — Andrew H Sue-Ako
(74) *Attorney, Agent, or Firm* — Bracewell LLP; Constance G. Rhebergen; Kevin R. Tamm

(57) ABSTRACT

A spacer fluid made of a viscosity thinner, a weighting agent, an antifoaming agent, and a non-ionic surfactant in a base aqueous fluid. In some instances, the viscosity thinner is a sulfomethylated tannin, the weighting agent is barium sulfate, the antifoaming agent is a silicone, and the non-ionic surfactant is an ethoxylated alcohol. A method of treating a well bore annulus in preparation of introducing water-based cement slurry into a well bore using the spacer fluid. A method of using the spacer fluid to position a first fluid into a well bore annulus of a well bore containing a second fluid. A method for fluidly isolating at least a portion of a well bore annulus in a well bore containing an oil-based drilling fluid using water-based cement slurry and the spacer fluid.

16 Claims, No Drawings

CEMENT OIL-BASED MUD SPACER FORMULATION

CROSS-REFERENCE TO RELATED PATENT APPLICATIONS

This application claims priority from U.S. Provisional Application No. 61/546,317, filed Oct. 12, 2011. For purposes of United States patent practice, this application incorporates the contents of the Provisional application by reference in entirety.

BACKGROUND OF THE INVENTION

1. Field of the Invention

The field of invention relates to a spacer fluid composition and method of use. More specifically, the field relates to a composition and method of using a spacer fluid that is compatible with both oil-based fluids and water-based fluids simultaneously.

2. Description of the Related Art

Well Bore, Tubular and Fluid Conduit

A well bore is a hole that extends from the surface to a location below the surface. The well bore can permit access as a pathway been the surface and a hydrocarbon-bearing formation. The well bore, defined and bound along its operative length by a well bore wall, extends from a proximate end at the surface, through the subsurface, and into the hydrocarbon-bearing formation, where it terminates at a distal well bore face. The well bore forms a pathway capable of permitting both fluid and apparatus to traverse between the surface and the hydrocarbon-bearing formation.

Besides defining the void volume of the well bore, the well bore wall also acts as the interface through which fluid can transition between the interior of the well bore and the formations through which the well bore traverses. The well bore wall can be unlined (that is, bare rock or formation) to permit such interaction with the formation or lined (that is, with casing, tubing, production liner or cement) so as to not permit such interactions.

The well bore usually contains at least a portion of at least one fluid conduit that links the interior of the well bore to the surface. Examples of such fluid conduits include casing, liners, pipes, tubes, coiled tubing and mechanical structures with interior voids. A fluid conduit connected to the surface is capable of permitting regulated fluid flow and access between equipment on the surface and the interior of the well bore. Example equipment connected at the surface to the fluid conduit includes pipelines, tanks, pumps, compressors and flares. The fluid conduit is sometimes large enough to permit introduction and removal of mechanical devices, including tools, drill strings, sensors and instruments, into and out of the interior of the well bore.

The fluid conduit made from a tubular usually has at least two openings—typically on opposing ends—with an enclosing surface having an interior and exterior surface. The interior surface acts to define the bounds of the fluid conduit. Examples of tubulars and portions of tubulars used in the well bore as fluid conduits or for making or extending fluid conduits include casing, production liners, coiled tubing, pipe segments and pipe strings. An assembly of several smaller tubulars connected to one another, such as joined pipe segments or casing, can form a tubular that acts as a fluid conduit.

When positioning a tubular or a portion of tubular in the well bore, the volume between the exterior surfaces of the fluid conduit or tubular portion and the well bore wall of the well bore forms and defines a well bore annulus. The well bore annulus has a volume in between the external surface of the tubular or fluid conduit and the well bore wall.

Well Bore Fluid

The well bore contains well bore fluid from the first moment of formation until completion and production. The well bore fluid serves several purposes, including well control (hydraulic pressure against the fluids in the hydrocarbon-bearing formation), well bore wall integrity (hydraulic pressure on the well bore wall; provides loss control additives) and lubricity (operating machinery). Well bore fluid is in fluid contact with all portions of and everything in the well bore not fluidly isolated, including the tubular internal fluid conduit, the well bore annulus and the well bore wall. Other fluid conduits coupled to the well bore often contain at least some well bore fluid.

While drilling, drilling fluid ("mud") fills the interior of the well bore as the well bore fluid. Some muds are petroleum-based materials and some are water-based materials. Petroleum-based materials comprise at least 90 weight percent of an oil-based mud (OBM). Examples of suitable base petroleum materials include crude oils, distilled fractions of crude oil, including diesel oil, kerosene and mineral oil, and heavy petroleum refinery liquid residues. A minor part of the OBM is typically water or an aqueous solution that resides internally in the continuous petroleum phase. Other OBM components can include emulsifiers, wetting agents and other additives that give desirable physical properties.

Oil-based muds also include synthetic oil-based muds (SOBMs). Synthetic oil-based muds are crude oil derivatives that have been chemically treated, altered or and refined to enhance certain chemical or physical properties. In comparison to a crude temperature fraction of a partially-refined crude oil, which may contain several classes (for example, alkane, aromatic, sulfur-bearing, nitrogen-bearing) of thousands of individual compounds, a SOBM can comprise one class with only tens of individual compounds (for example, esters compounds in a $C_{8-14}$ range). Examples of materials used as base fluids for SOBMs include linear alpha olefins, isomerized olefins, poly alpha olefins, linear alkyl benzenes and vegetable and hydrocarbon-derived ester compounds. SOBMs are monolithic systems that behave in a manner as if they were an oil-based mud but provide a more narrow and predictable range of chemical and physical behaviors.

While performing drilling operations, well bore fluid circulates between the surface and the wellbore interior through fluid conduits. Well bore fluid also circulates around the interior of the well bore. The introduction of drilling fluid into the well bore through a first fluid conduit at pressure induces the motivation for the fluid flow in the well bore fluid. Displacing well bore fluid through a second fluid conduit connected to the surface causes well bore fluid circulation from the first fluid conduit to the second fluid conduit in the interior of the well bore. The expected amount of well bore fluid displaced and returned to the surface through the second fluid conduit is equivalent to the amount introduced into the well bore through the first fluid conduit. Parts of the well bore that are fluidly isolated do not support circulation.

Drilling muds that are not water based tend to dehydrate and lose additives during drilling operations. Dehydrated and additive-poor residues can collect in lower-flow velocity parts as solids, gels and highly viscous fluids. "Filter cake" is a layer of deposited solids and gelled drilling fluid that adheres to the interior surfaces of the well bore, including the well bore wall and the exterior of the fluid conduit.

Cementing the Well Bore

Cementing is one of the most important operations in both drilling and completion of the well bore. Primary cementing occurs at least once to secure a portion of the fluid conduit between the well bore interior and the surface to the well bore wall of the well bore.

A variety of water-based cements slurries is available for primary cementing operations. Primary cements typically contain calcium, aluminum, silicon, oxygen, iron and sulfur compounds that react, set and harden upon the addition of water. The water used with the cement slurry can be fresh water or salt water and depend on the formation of the cement slurry and its tolerance to salts and free ions. Suitable water-based cements include Portland cements, pozzolana cements, gypsum cements, high alumina content cements, slag cements, silica cements, high alkalinity cements, latex and resin-based cements. Cement slurries useful primary cementing operations meet the standards given by the American Petroleum Institute (API) in Specification 10A for classes A-H.

Primary cementing forms a protective solid sheath around the exterior surface of the introduced fluid conduit by positioning cement slurry in the well bore annulus. Upon positioning the fluid conduit in a desirable location in the well bore, introducing cement slurry into the well bore fills at least a portion if not all of the well bore annulus. When the cement slurry cures, the cement physically and chemically bonds with both the exterior surface of the fluid conduit and the well bore wall, coupling the two. In addition, the solid cement provides a physical barrier that prohibits gases and liquids from migrating from one side of the solid cement to the other via the well bore annulus. This fluid isolation does not permit fluid migration uphole of the solid cement through the well bore annulus.

Displacing well bore fluid for primary cementing operations is similar to establishing circulation in the well bore fluid with a drilling mud. An amount of cement slurry introduced into the well bore through a first fluid conduit induces fluid flow in the well bore and displaces an equivalent amount of well bore fluid to the surface through a second fluid conduit. In such an instance, the well bore fluid includes a portion of the well bore fluid previously contained in the well bore before cement introduction as well as the amount of the introduced cement slurry.

Cementing in the presence of filter cake can cause a cementing job to fail. The adhesion of filter cake and gelled fluid to the well bore wall or the tubular exterior is weak compared to the bond that cement can make. Cementing on top of filter cake strips the cake off the walls and exterior surfaces due to the weight of the cement upon curing. This lack of direct adhesion creates fluid gaps in and permits circulation through the well bore annulus.

Incompatible Fluid Interaction

Direct contact between the water-based cement slurry and the oil-based drilling mud can result in detrimental fluid interactions that can jeopardize not only cementing operations but also the integrity of the well bore. The intermingling of incompatible fluids can create emulsions (both water-in-oil and oil-in-water emulsions) between the fluids. The emulsions, which resist fluid movement upon the application of force, raises the viscosity profile of the well bore fluid. Increasing pumping head pressure to maintain a constant fluid circulation rate in the well bore can result in damaging the formation downhole as well bore fluid pressure exceeds the fracture gradient of the formation.

Besides detrimentally affecting the viscosity profile, when solids and water from the cement slurry transfer into the oil-based drilling mud during emulsification, the oil-based mud properties are detrimentally affected. Dilution, chemical interaction, breaking of a water-in-oil emulsion and flocculation of suspended additives out of the oil phase can also occur.

Cement slurry properties can also suffer from contamination by the OBM. Flocculation of weighting agents and macromolecules can cause the cement to have reduced compressive strength. The diffusion of ionic species from the OBM can cause premature setting of the cement slurry. The ramifications of early cement hardening include equipment damage, time delay, well bore damage and possible loss of the entire tubular string. Contamination of the cement slurry with bulk OBM results in higher slurry viscosity and higher fluid losses from the hardening slurry.

SUMMARY OF THE INVENTION

The invention includes a composition for use as a spacer fluid between two incompatible fluids having a viscosity thinner, a weighting agent, an antifoaming agent and a non-ionic surfactant in a base aqueous fluid. The spacer fluid is compatible with both fluids. An embodiment of the composition includes having a composition with a sulfomethylated tannin viscosity thinner, a barium sulfate weighting agent, a silicone antifoaming agent and an ethoxylated alcohol non-ionic surfactant.

The invention includes a method of treating a well bore annulus in preparation of introducing water-based cement slurry into a well bore. The well bore contains a well bore fluid. The method includes the steps of introducing a spacer fluid into the well bore and positioning the spacer fluid in the well bore annulus. The spacer fluid water-wets the exterior surface of the tubular and the well bore wall such that the water-based cement slurry can adhere to both surfaces. The spacer fluid is made of a chemically modified tannin, barite, a silicone liquid and an ethoxylated alcohol in an aqueous base fluid. The spacer fluid is compatible with both the water-based cement slurry and the well bore fluid. The spacer fluid is operable to separate physically the water-based cement slurry from the fluid in the well bore.

The invention includes a method of using the spacer fluid to position a first fluid into a well bore annulus of a well bore containing a second fluid. The spacer fluid is made of a chemically modified tannin, barite, a silicone liquid and an ethoxylated alcohol in an aqueous base fluid. The method includes the step of introducing into the well bore through a first fluid conduit an amount of the spacer fluid. The spacer fluid fluidly couples with the second fluid. The spacer fluid introduction displaces an equivalent amount of the fluid in the well bore through a second fluid conduit. The spacer fluid introduction is at a pressure adequate to induce laminar fluid flow of the fluid in the well bore annulus. The method also includes the step of introducing into the well bore through the first fluid conduit an amount of the first fluid. The first fluid fluidly contacts the spacer fluid in the well bore. The first fluid introduction displaces an equivalent amount of the fluid in the well bore through the second fluid conduit. The first fluid introduction induces laminar fluid flow of the fluid in the well bore annulus. The method includes the step of positioning a portion of the first fluid in the well bore annulus.

The invention includes a method for fluidly isolating at least a portion of a well bore annulus in a well bore containing an oil-based drilling fluid using water-based cement slurry. The spacer fluid is made of a chemically modified tannin, barite, a silicone liquid and an ethoxylated alcohol in an aqueous base fluid. The water-based cement slurry and the oil-based drilling fluid are incompatible with one another; however, both compatible with the spacer fluid. The method includes the step of introducing into the well bore through the first fluid conduit an amount of spacer fluid. The spacer fluid couples to the oil-based drilling fluid in the well bore. The spacer fluid introduction displaces an equivalent amount of the fluid in the well bore through the second fluid conduit. The spacer fluid introduction induces laminar fluid circulation of the fluid in the well bore through the well bore annulus. The method also includes the step of positioning the spacer fluid composition in the well bore annulus such that the spacer fluid composition fluidly contacts a portion of the tubular exterior surface and a portion of the well bore wall of the well bore annulus. The spacer fluid contacting the surfaces makes both surfaces water-wet. The method also includes the step of introducing into the well bore through the first fluid conduit an amount of water-based cement slurry. The water-based cement slurry contacts the spacer fluid in the well bore. The water-based cement slurry introduction displaces an equivalent amount of the fluid in the well bore through a second fluid conduit. The water-based cement slurry introduction induces laminar fluid circulation of the fluid in the well bore through the well bore annulus. The water-based cement is operable to cure into solid cement at well bore conditions. The method also includes the step of positioning the water-based cement slurry such that at least a portion of the water-based cement slurry fluidly contacts both the external surface of the tubular and the well bore wall of the well bore at the same time. The method also includes the step of maintaining the water-based cement slurry in the well bore annulus until the water-based cement slurry adheres to the water-wetted portions of the tubular exterior surface and the well bore wall. Maintaining the position also occurs until the cement slurry cures into the solid cement material. When the water-based cement cures into a solid cement material in the well bore annulus, a portion of the well bore annulus is fluidly isolated from the remainder of the well bore.

The spacer fluid composition positioned between the water-based cement slurry and the oil-based drilling mud prevents negative direct interactions between the incompatible fluids. The spacer fluid is chemically compatible with both water-based fluids, including cement slurries, and oil-based fluids, including oil-based drilling fluids or muds, simultaneously.

Compatible fluids can form a fluid mixture that does not undergo undesirable chemical or physical reactions. An indication of physical compatibility between fluids includes determining the rheological attributes, including shear viscosity, of the blend of fluids. Chemical compatibility includes no or desirable changes to chemical-related attributes, including thickening time, compressive strength of resultant solids, static gels and fluid loss. Verifying compatibility ensures that the introduction of the spacer fluid into the well bore does not create new incompatibilities.

The spacer fluid composition is such that if the spacer fluid is contaminated by both the water-based fluid and the oil-based fluid in amounts as great as 25 percent by volume of the total fluid volume that the contaminated spacer fluid can be circulated without requiring significantly higher fluid head pressure than uncontaminated spacer fluid. The spacer fluid does not harden, gelatinize or otherwise become immobile in the well bore because of contamination.

In using the spacer fluid, the two fluids do not have to be incompatible with one another. In some situations, the separated fluids may be "too compatible" with one another mingle. This mingling of like fluids may cause the two fluids to lose their advantageous attributes. The spacer fluid is also useful for separating different drilling fluids during drilling fluid change outs, for separating a drilling fluid and an aqueous fluid, including a completion brine or seawater, during well integrity testing, and for "water-wetting" the well bore wall and surfaces in the well bore.

BRIEF DESCRIPTION OF THE DRAWINGS

No drawings.

DETAILED DESCRIPTION OF THE PREFERRED EMBODIMENTS

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector.

Spatial terms describe the relative position of an object or a group of objects relative to another object or group of objects. The spatial relationships apply along vertical and horizontal axes. Orientation and relational words including "up" and "down" and other like terms are for descriptive convenience and are not limiting unless otherwise indicated.

Where a range of values is provided in the Specification or in the appended Claims, it is understood that the interval encompasses each intervening value between the upper limit and the lower limit as well as the upper limit and the lower limit. The invention encompasses and bounds smaller ranges of the interval subject to any specific exclusion provided.

All publications mentioned in the Specification are incorporated by reference to disclose and describe the methods or materials, or both, in connection with which the publications are cited.

Where reference is made in the Specification and appended Claims to a method comprising two or more defined steps, the defined steps can be carried out in any order or simultaneously except where the context excludes that possibility.

Spacer Fluid Composition

The spacer fluid includes a base aqueous fluid, a viscosifier, a weighting agent, a non-ionic surfactant and an antifoaming agent. The viscosifier has a component that can act to thin gels to ease removing them from well bore walls and surfaces. In addition, the thinner component interacts with charged particles in the well bore fluid to suspend them for removal from the well bore. The weighting agent increases the density of the spacer fluid so that it fits in the density profile between the fluids it is separating to prevent fluid inversion or fingering. The weighting agent also assists with increasing the buoyancy effect of the spacer fluid on gelled drilling fluids and filter cake. The non-ionic surfactant enhances the chemical compatibility of the spacer fluid with the oil-based fluid. The surfactant leaves both the well bore wall and exposed surfaces in the well bore interior "water-wet" by removing non-aqueous materials, which enhances the capability of the cement to adhere to the surfaces. The surfactant also interacts with hydrocarbon-coated solids to suspend them in the aqueous solution for transport out of the well bore. The antifoaming agent prevents the formation of foams and emulsions between the aqueous and hydrocarbon-based fluids by lowering the surface tension between the materials.

Although not intending to be bound by theory, many of the components of the spacer fluid composition can secondarily supplement desirable properties of the spacer fluid. For example, the antifoaming agent can also act as a minor surfactant in certain operative environments.

Base Aqueous Fluid

The base aqueous fluid of the spacer fluid composition can include deionized, tap, distilled or fresh waters; natural, brackish and saturated salt waters; natural, salt dome, hydrocarbon formation produced or synthetic brines; filtered or untreated seawaters; mineral waters; and other potable and non-potable waters containing one or more dissolved salts, minerals or organic materials. Fresh water is preferable because of potential issues with introducing unnecessary amounts of ions, metals and minerals to cement slurry compositions that are more sensitive to such materials. The base aqueous fluid is present in a range of from about 70% to about 95% of the total volume of the spacer fluid composition.

Viscosifier

The spacer fluid composition includes a viscosifier. The viscosifier induces rheological properties (that is, thickening) in the spacer fluid composition that supports particle suspension and helps to prevent losses into the other fluids or the formation. The viscosifier can include biological polymers, clays, ethoxylated alcohols and polyether glycols. Biological polymers and their derivatives include polysaccharides, including xanthan gums, welan gums, guar gums, cellulose gums, corn, potato, wheat, maize, rice, cassava, and other food starches, succinoglycan, carrageenan, and scleroglucan and other intracellular, structural and extracellular polysaccharides. Biological polymers also include chemically modified derivatives such as carboxymethyl cellulose, polyanionic cellulose and hydroxyethyl cellulose (HEC) and forms of the polymers suspended in solvents. Clays and their derivatives include bentonite, sepiolite, attapulgite, and montmorillionite. Polyalklyene glycols include polyethylene glycols and polypropylene glycols, which are macromolecules with a series of internal ether linkages. Polyalklyene glycols are capable of dissolving in water and have a greater impact on viscosity with higher molecular weight.

The viscosifier can also include a viscosity thinner. A viscosity thinner reduces flow resistance and gel development by reducing viscosity of the spacer fluid. Thinners can reduce the flow resistance and gel development of filter cake and disrupt gelled materials that the spacer fluid composition contacts in the well bore. Thinners comprising large molecular structures can also act as fluid loss additives. The functional groups of the viscosity thinners can act to emulsify oils and hydrocarbons present in the aqueous phase. Chemically modified viscosity thinners can attract solids and particles in the spacer fluid and disperse such particles, the dispersion of particles preventing any increase in viscosity of the spacer fluid due to aggregation. Ionic thinners can counter-act the effects of cement slurry intrusion into the aqueous spacer. Cement intrusion in the spacer fluid composition can result in greater saline concentration or higher pH, which in turn can cause the gel strength or the yield point value, or both, of the spacer fluid to rise. Low gel strength and yield point values are preferred to maintain lower spacer fluid pumping pressure.

Polyphenolics, which include tannins, lignins, and humic acids, and chemically modified polyphenolics are useful viscosity thinners. Tannins and their chemically modified derivatives can either originate from plants or be synthetic. Examples of plant-originating tannins include tannins from pine, redwood, oak, and quebracho trees and bark; grapes and blueberries; and walnuts and chestnuts.

Chemically modified tannins include sulfomethylated and other sulfoalkylated tannins, causticized tannins, sulfated tannins, sodium-complexed tannin and sulfomethylated quebracho. Chemically modified lignins include sodium lignosulfonates, sugar-containing lignosulfonates, and de-sugared lignosulfonates. Humic acids, such as those extracted from decaying tree bark, are also useful rheology modifiers. Useful polyphenoics dissolve in the base aqueous fluid. In some instances, the chemically modified tannin pairs with similar ionic specie to assist in dissolving the tannin in the aqueous solution. For example, sulfomethylated tannins paired with ferrous sulfates are soluble in aqueous solutions.

A commercially available viscosifier useful in an embodiment of the spacer fluid composition includes DIACEL® Adjustable Spacer Viscosifier (Drilling Specialties Co.; The Woodlands, Tex.). DIACEL® Adjustable Spacer Viscosifier includes 2-Acrylamido-2-Methylpropane Sulfonic Acid, Sodium Salt; Acrylamide; Sodium Lignite; Acrylic Acid; Stannous Sulfate; Oxirane; Sodium monochloroacetate; and Propylene oxide.

The viscosifier is present in the spacer fluid composition by weight per barrel of base aqueous solution in the spacer fluid composition. The viscosifier is present in the spacer fluid composition in a range of from about 5 pounds to about 10 pounds per barrel of base aqueous fluid. One of ordinary skill in the art recognizes the appropriate amount of viscosifier for the spacer fluid composition given the application circumstances and therefore understands that all values within the provided range are included.

Weighting Agent

The spacer fluid composition also contains a weighting agent. The weighting agent provides the spacer fluid with the proper density profile to separate the fluids from one another. The proper weighing of the spacer fluid composition relative to each fluid ensures that the spacer fluid composition does not "invert" with one of the other fluids present in the well bore. Weighting agents include sand, barite (barium sulfate), hematite, fly ash, silica sand, ilmenite, manganese oxide, manganese tetraoxide, zink oxide, zirconium oxide, iron oxide and fly ash. The preferred weighting agent for the spacer fluid composition is barite. Embodiments of the spacer fluid composition include compositions not including calcium carbonate as the weighting agent.

The weighing agent is present in the spacer fluid composition by weight per barrel of base aqueous solution in the spacer fluid composition. The weighting agent is present in the spacer fluid composition in a range of from about 100 pounds to about 400 pounds per barrel of base aqueous fluid. One of ordinary skill in the art recognizes the appropriate amount of weighing agent for the spacer fluid composition given the application circumstances and therefore understands that all values within the provided range are included.

The density profile of the spacer fluid composition relative to the other fluids is such that the spacer fluid composition has a similar or greater density than the displaced fluid but has a lower density than the displacing fluid. In some instances, the displaced fluid is the oil-based mud and the displacing fluid is the water-based cement slurry. The higher density spacer fluid composition pushes gelled and solid remnants of the displaced fluid away from the well bore wall and fluid conduit exteriors.

The spacer fluid composition has a density in the range of from about 70 to about 120 pounds per cubic foot. One of ordinary skill in the art recognizes that spacer fluids can have a density at any value within this range given the application circumstances and therefore understands that all values within the provided range are included.

Antifoaming Agent

The spacer fluid composition also includes an antifoaming agent. Antifoaming agents reduce surface tension and prevent emulsions from forming between the aqueous spacer fluid composition and hydrocarbons in the OBM and in the well bore interior.

An embodiment of the spacer fluid composition includes an antifoaming agent that is a polysiloxane material. Polysiloxanes are macromolecules that have branched or unbranched backbones consisting of alternating silicon and oxygen atoms with hydrocarbon or hydrogen branching groups. "Silicone" and "silicone oil" are other names for polysiloxanes. Examples of silicones include polydimethylsiloxane (dimethicone; PDMS), polymethylhydrosiloxane (PMHS) and polydiphenylsiloxane (PDPS). Silicones can be end-capped with functional groups such as methyl and hydroxyl groups. The antifoaming agent is a preferably a silicone-based liquid.

To improve water solubility in aqueous solutions while retaining the ability for the silicone to interact with non-aqueous systems, some silicone antifoams include polysiloxanes copolymerized with polyoxyalkylene functional groups to form copolymers. The copolymerization can be branch or block. Some refer to copolymers of silicone and ethoxylated, propoxylated or co-ethoxylated/propoxylated glycols as "silicone copolyols", "silicone glycols" and "silicone polyethers".

Silicone oils and glycols can combine with treated silica materials to form antifoaming agents. The silica acts to push the silicone fluid through the foam and assist it onto the foam surface. Silica can also act to disrupt foam formation. Examples of useful treated silica include methylated silica, trimethylated silica, treated amorphous silica, PDMS-treated silica and amorphous fumed silica.

Crude oil hydrocarbon fraction and compounds from crude oil are also useful as antifoaming agents. Examples include paraffinic oils and mineral oils. Vegetable oils, including corn oil, and legume oils, including peanut oil, are also useful antifoaming agents. Fatty alcohols having a carbon count in a range from 8 to 32 carbons are also useful antifoaming agents. Polyoxyalkylene co- and tri-block polymers containing propylene oxides or butylene oxides, or both, with ethylene oxides, can disrupt emulsion combinations.

A commercially available antifoaming agent useful in an embodiment of the spacer fluid composition includes DIACEL® ATF-S (Drilling Specialties Co.; The Woodlands, Tex.). DIACEL® ATF-S includes propylene oxide.

The antifoaming agent is present in the spacer fluid composition by volume per barrel of base aqueous solution in the spacer fluid composition. The antifoaming agent is present in the spacer fluid composition in a range of from about 0.01 gallons to about 0.2 gallons per barrel of base aqueous fluid. One of ordinary skill in the art recognizes the appropriate amount of antifoaming agent for the spacer fluid composition given the application circumstances and therefore understands that all values within the provided range are included.

Non-Ionic Surfactant

The spacer fluid composition contains a non-ionic surfactant. The non-ionic surfactant is a surface-active agent that does not dissociate into ions in aqueous solutions, unlike an anionic surfactant, which has a negative charge, and a cationic surfactant, which has a positive charge, in an aqueous solution. The non-ionic surfactant is compatible with both ionic and non-ionic components of the spacer fluid composition because it is charge-neutral. Hydrophilic functional groups present on non-ionic surfactants can include alcohols, phenols, ethers, esters and amides. Non-ionic surfactants are widely used as detergents, have good solvency in aqueous solutions, exhibit low foam properties and are chemical stable.

An embodiment of the spacer fluid composition includes a non-ionic surfactant that is an ethoxylated alcohol. Some refer to ethoxylated alcohols as "polyoxyalkylene glycol alkyl ethers", which describes the reaction product of an alcohol (alkyl) with the degree of ring-opening oligomerization that the alkyloxide undergoes to form the ethoxylated reaction product (polyoxyalkylene glycol). Both sections of the resultant molecule join through an ether link. The non-ionic surfactant in some instances is an ethoxylated alcohol.

Alcohols useful to form the alkyl portion of the ethoxylated alcohol include normal, iso-, and cyclo-aliphatic alcohols. Example alcohols include fatty alcohols and long-chained alcohols with slight branching having a carbon count from about 3 to about 30 carbons, isopropanol, n-butanol and cyclohexanol. Primary and secondary alcohols are included.

The degree of ethoxylation for the ethoxylated alcohol depends on several factors. The degree of ethoxylation, which refers to the number of ethylene oxides used to form the polyoxyethylene glycol portion of the surfactant, can range from about 2 to about 50 for the ethoxylated alcohol. Considerations include the carbon count of the alcohol, the desired overall solubility of the surfactant in the spacer fluid, foaming/emulsion effects of the surfactant-hydrocarbon complex, and the balance between hydrophobic effects of the alkyl portion of the surfactant to the hydrophilic effects of the polyethoxylated portion of the surfactant. For fatty alcohols, the degree of ethoyxlation is typically between about 4 and about 40 depending on the end-use of the ethoxylated fatty alcohol.

Other useful non-ionic surfactants for the spacer fluid composition include ethoxylated phenols and ethoxylated alkyl phenols. The ether link between the ethoxylated portion and the phenol/alkyl phenol portion of the surfactant forms from reaction of the alcohol moiety on the phenol. For alkyl phenols, an alkyl functional group extends from the phenol that contributes to the hydrophobic properties of the surfactant. Example alkyl phenols include dodecylphenols, nonylphenols, octylphenols. The degree of ethoxylation ranges from about 4 to about 50.

Non-ionic surfactants for the spacer fluid composition also include various epoxide block co-polymerizations of ethylene oxide with other alkoxylates, including components formed from propylene oxide and butylene oxide. The alkoxylates are capable of foaming co-, ter-, and higher order macromolecules and polymers. For example, a polypropylene oxide glycol (hydrophobic portion) allowed to react with several ethylene oxides can faun an ABA configuration EO/PO/EO polymeric surfactant. These alkoxylated tri-block macromolecules are also known as "poloxamers".

Examples of other useful non-ionic surfactants for the spacer fluid composition include fatty alcohols; alkypolyglucosides; alkoxylated oils and fats, including ethoxylated lanolin, castor oil, and soy bean oil; fatty amine ethoxylates; alkanolamides, including monoalkanolamides, dialkanolamides, and esteramides; alkoxylated alkanolamides, including polyethoxylated monoalkanolamides and polyethoxylated dialkanolamide; alkoxylated fatty acid monoesters and diesters; alkoxylated glycols and glycol esters, including ethoxylated glycol monoester and ethoxylated glycerol monoester; alkoxylated amines, including mono-, di-, and triethanolamine; ethoxylated polysiloxanes and silicones; ethoxylated thiols, including ethoxylated ter-dodecyl mercaptan; and ethoxylated imidazoles.

To assist in incorporating the non-ionic surfactant in an aqueous medium, the non-ionic surfactant can also include other components in various proportions, including alcohols, refined crude oil fractions and polar hydrocarbons. For example, isopropyl alcohol, naphthalene and heavy aromatic petroleum naphtha are useful for delivering the non-ionic surfactant into an aqueous medium.

A commercially available non-ionic surfactant useful in an embodiment of the spacer fluid composition includes LoSurf-259™ Nonemulsifier (Halliburton Energy Services; Duncan, Okla.). LoSurf-259™ Nonemulsifier includes heavy aromatic petroleum naphtha and isopropanol.

The non-ionic surfactant is present in the spacer fluid composition by volume per barrel of base aqueous solution in the spacer fluid composition. The non-ionic surfactant is present in the spacer fluid composition in a range of from about 1.5 gallons to about 2.0 gallons per barrel of base aqueous fluid. One of ordinary skill in the art recognizes the appropriate amount of non-ionic surfactant for the spacer fluid composition given the application circumstances and therefore understands that all values within the provided range are included.

Other Additives

The spacer fluid can include additional components, including, for example, curing agents, salts, corrosion inhibitors, oxygen scavengers, scale inhibitors and formation conditioning agents. One of ordinary skill in the art recognizes the appropriate amount and type of additives for a particular application.

Making Spacer Fluids

The spacer fluid composition forms by combining the viscosifier, the weighting agent, the antifoaming agent, and the non-ionic surfactant into the base aqueous fluid. An example method of combining the spacer fluid components includes introducing into a vessel capable of retaining the spacer fluid composition a sufficient quantity of base aqueous fluid. Introducing each component into the base aqueous fluid separately and mixing the blend such that all the spacer fluid components are fully incorporated forms the spacer fluid composition. Blending means can include mixing using a low- or high-shear blender.

"On the fly" mixing of the components is not recommended because some components are typically solids and the other components are typically liquids. Batch mixing of the spacer fluid components until homogeneous incorporation and formation of the space fluid composition is preferred.

Methods of Using the Spacer Fluid Composition

A method for using the spacer fluid composition includes using the spacer fluid to position one fluid into the well bore containing another fluid. In some cases, the two fluids are incompatible with one another. For instance, water-based cement slurries and oil-based drilling muds are two fluids that are incompatible with one another. The spacer fluid used in the methods is compatible with both fluids. The well bore fluid initially comprises only one fluid, such as the oil-based drilling mud.

As previously described, the well bore contains at least a portion of a tubular, which has an internal fluid conduit and an external surface. The internal fluid conduit fluidly couples the surface with the well bore. The well bore annulus forms between the external surface of the tubular and the well bore wall.

More than one fluid conduit coupling the surface with the well bore permits circulation of the well bore fluid. The well bore fluid circulates from a first fluid conduit coupled with the surface through the well bore to a second fluid conduit coupled with the surface. In some instances, the tubular is one of the fluid conduits and the well bore fluid circulates through the internal fluid conduit of the tubular. The circulation rate of well bore fluid through the well bore is determinable in the well bore annulus.

When using the spacer fluid to displace one fluid with another, a certain amount of contamination occurs between fluids. At the interface of adjacent fluids, contamination occurs through direct contact at the fluid-fluid interface by way of diffusion. As fluids move, a minor amount of contamination occurs between the fluids. One fluid trailing another fluid through a fluid system picks up remnants of the leading fluid—off the well bore wall or from the surface of the tubular. The amount of contamination in the trailing fluid increases with both time and fluid flow rate.

In a method for using the spacer fluid, introduction and positioning of each fluid in the well bore occurs at a fluid flow rate that is laminar or in a "plug flow" regime. Contamination between the fluids is lower if the fluids remain in a stagnant position relative to one another. As fluid flow increases—moving from laminar or plug flow towards a turbulent flow regime—the adjacent fluids begin physical mixing with one another as momentum acts on the fluids and pushes them into one another. Plug flow has an added benefit in practice of prolonging exposure of the well bore wall and the exterior tubular wall to the surfactants and the aqueous base fluid in the spacer fluid.

Introduction of the spacer fluid occurs through the first fluid conduit. The first fluid conduit in some instances is the tubular, where the fluid passes through the internal fluid conduit into the well bore. Introduction of the spacer fluid occurs at a pressure sufficient to induce laminar fluid circulation in the well bore fluid. Upon introduction, the spacer fluid contacts the fluid in the well bore and circulates the well bore fluid from the first fluid conduit to the second fluid conduit. The spacer fluid introduction displaces an equivalent amount of well bore fluid through the second fluid conduit. In some instances, the amount of spacer fluid displaces the entire well bore. In other instances, the amount of spacer fluid displaces the annular space of the well bore. In yet some other instances, the amount of spacer fluid displaces the fluid present in the tubular internal fluid conduit. The spacer fluid while in the well bore becomes part of the well bore fluid.

Introduction of another fluid that is different from the well bore fluid into the well bore occurs through the first fluid conduit. Introduction of another fluid into the well bore after the spacer fluid is at a pressure sufficient to induce laminar fluid circulation in the well bore fluid. When introduced, the post-spacer fluid contacts the spacer fluid in the well bore, causing the well bore fluid to circulate through the well bore in a direction from the first fluid conduit to the second fluid conduit. The second fluid introduction displaces an equivalent amount of well bore fluid through the second fluid conduit.

Positioning the second fluid occurs such that at least a portion of the fluid occupies at least some of the well bore annulus. In some methods, introduction of a third fluid to position the second fluid in the well bore annulus using similar techniques as previously described with displaces well bore fluid. In most instances, the third fluid is another amount of spacer fluid, a spacer fluid with a different composition, or water, including seawater and fresh water.

A method for using the spacer fluid includes fluidly isolating at least part of the well bore annulus in the well bore. The fluid used to isolate the well bore annulus is water-based cement slurry. In some methods, the well bore contains an oil-based drilling fluid. Water-based cement slurries and oil-based drilling fluids are incompatible. The water-based cement slurry cures into a solid cement material that is capable of isolating at least part of the well bore annulus. The spacer fluid is compatible with both the oil-based drilling fluid and the water-based cement slurry.

Introduction of the spacer fluid into the well bore occurs through a first fluid conduit. The amount of spacer fluid introduced is at a pressure adequate to induce laminar fluid circulation in the well bore fluid such that it displaces an equivalent amount of well bore fluid through a second fluid conduit. The introduced spacer fluid contacts the well bore fluid in the well bore.

Introduction of the water-based cement slurry occurs through the first fluid conduit. The introduced water-based cement slurry induces laminar fluid circulation in the well bore fluid and displaces an equivalent amount of well bore fluid through the second fluid conduit. The water-based cement slurry contacts the spacer fluid portion of the well bore fluid.

Positioning a portion of the water-based cement slurry in the well bore annulus occurs such that cement slurry contacts both the tubular external surface and the well bore wall. Maintaining the position of the water-based cement permits the cement to adhere to the water-wet surfaces of the well bore wall and tubular exterior. It also permits the well bore conditions to induce curing in the cement. Upon curing, the water-based cement slurry forms a solid cement material in the well bore annulus, fluidly isolating at least a portion of the well bore annulus.

In some methods, introduction of additional fluids into the well bore through the first fluid conduit positions the water-based cement slurry in the well bore annulus. Introducing the additional fluid causes it to contact the cement slurry while in the well bore. The additional fluid partially displaces the well bore fluid such that the water-based cement slurry is in the well bore annulus.

The amount of spacer fluid employed in all methods is adequate to keep fluids separated, especially incompatible fluids during introduction and positioning.

Examples of specific embodiments given facilitate a better understanding of the spacer fluid composition and method of use. In no way do the Examples limit or define the scope of the invention.

EXAMPLES

Mixing and testing of the Example spacer fluid compositions with the water-based cements and oil-based muds both separately and in combination is in accordance with the procedure of Chapter 16 of American Petroleum Institute (API) Recommend Practice 10B-2 (2005), titled "Recommended Practice for Testing Well Cements", which adopts International Organization for Standardization (ISO) 10426-2.

Example Spacer Fluid Compositions 1-3

The procedures given in Section 16.2 of API RP 10B-2 guide the preparation of the each example spacer fluid composition, water-based cement slurry, and oil-based mud.

Example 1-3 spacer fluid compositions each incorporate an amount of viscosifier (DIACEL® Adjustable Spacer Viscosifier), weighting agent (barite), antifoaming agent (DIACEL® ATF-S Antifoam) and non-ionic surfactant (LO-SURF™-259 Nonemulsifier) in an amount of base aqueous fluid (fresh water) per Table 1.

TABLE 1

Formulations for spacer fluid compositions Examples 1-3.
Formulation of Spacer Examples 1-3

| | Components | | | | | |
|---|---|---|---|---|---|---|
| Examples | Fresh Water Bbls | Viscosifier Lbs | Weighting agent Lbs | Non-foaming agent Gals | Non-ionic surfactant Gals | Density Lbm/Ft 3 |
| Example 1 | 0.927 | 6.8 | 108 | 0.1 | 1.5 | 77 |
| Example 2 | 0.840 | 6.8 | 195 | 0.1 | 1.5 | 89 |
| Example 3 | 0.796 | 6.8 | 300 | 0.1 | 1.5 | 102 |

The water-based cement slurry Cement 1 for testing Example 1 is Class G-based cement slurry having a density of 101 pounds-per-cubic foot (1 $b_m/ft^3$). The yield is 2.22 cubic feet of cement slurry from 11.36 gallons of water per sack, based with 35% aggregate and other traditional well bore cementing additives. Cement 2, used for testing Example 2, has the same formulation and properties as Cement 1. The water-based cement slurry Cement 3 for testing Example 3 is Class G-based latex cement slurry having a density of 125 $lb_m/ft^3$. The yield is 1.37 cubic feet of cement slurry from 3.34 gallons of water per sack, based with 35% aggregate and other traditional well bore latex cement additives.

The oil-based mud OBM 1 for testing Example 1 is a diesel oil-based mud (0.923 bbl diesel/bbl OBM) having a density of 56 pounds-per-cubic foot ($lb_m/ft^3$). The oil-based mud OBM 2 for testing Example 2 is a safra oil-based (0.414 bbl/bbl OBM) mud having a density of 80 $lb_m/ft^3$. The oil-based mud OBM 3 for testing Example 3 safra oil-based (0.409 bbl/bbl OBM) mud having a density of 81 $lb_m/ft^3$.

Example 1

Table 2 shows the results of compatibility testing per Section 16.3 of API RP 10B-2 (Rheology) for various mixtures of spacer fluid composition Example 1, water-based cement slurry Cement 1 and oil-based mud OBM 1. The different volume ratios simulate different levels of contamination and interaction between the various fluids downhole.

Viscosity trends at different blending ratios of two or more fluids and at different rotational viscosity rates help to demonstrate fluid compatibility. Viscosity is a measure of the resistance of a fluid to deform under shear stress and the resistance of a material to flow. A significant viscosity increase indicates that the fluids are incompatible with one another, which would require greater head pressure to move the combined incompatible fluids through a fluid system. Likewise, a nonhomogeneous fluid admixture also indicates the fluids are incompatible. A chemical reaction may be one where solids suspended in one fluid flocculate out after the introduction of another fluid. If the two or more fluids mix and do not undergo undesirable chemical and physical reactions then they are considered compatible with one another.

For measuring actual or true rotation viscosity, a rotational cylinder and bob instrument, for example a Fann viscometer, determines rotational viscosity in centi-Poise (cP) at 300, 200, 100, 6 and 3 rotations-per-minute (RPM). High viscosity readings across an entire range of rotational viscosity readings indicate incompatibility between the fluids in the mixture tested. A deviation from a linear trend in viscosity between two substances—such as a "bump" or "spike"—can indicate incompatibility at the compositional ratio tested.

Plastic Viscosity (PV), also measured in cP, is the resistance of a fluid to continual flow, like kinetic friction. The Yield Point (YP), measured as pounds per 100 square feet, is the resistance of initial flow of fluid or the stress required in order to move the fluid, like static friction. Both PV and YP tend to increase with contamination of an aqueous fluid. Water in an oil-based mud will increase the PV and YP values for the OBM.

TABLE 2

Compatibility tests between Example 1, OBM 1 and water-based cement slurry Cement 1. Compatibility Testing of Example 1

| | Properties | | | | | | |
|---|---|---|---|---|---|---|---|
| | Viscometer Readings | | | | | Plastic Vis- | Yield Point lb/ |
| Fluid Mixtures | 300 cP | 200 cP | 100 cP | 6 cP | 3 cP | cosity cP | 100 ft^2 |
| Cement 1 - 101 PCF | 17 | 13 | 9 | 3 | 2 | 12 | 5 |
| Example 1 - 77 PCF | 8 | 6 | 5 | 2 | 1 | 4 | 4 |
| OBM 1 - 56 PCF | 15 | 12 | 9 | 5 | 4 | 9 | 6 |
| OBM1:Ex1 95:5 | 17 | 14 | 11 | 7 | 6 | 9 | 9 |
| OBM1:Ex1 75:25 | 21 | 17 | 13 | 7 | 6 | 12 | 10 |
| OBM1:Ex1 50:50 | 25 | 20 | 14 | 7 | 6 | 16 | 9 |
| OBM1:Ex1 25:75 | 9 | 7 | 5 | 2 | 1 | 6 | 3 |
| OBM1:Ex1 5:95 | 8 | 6 | 5 | 2 | 1 | 4 | 4 |
| Cement1:Ex1 95:5 | 19 | 14 | 10 | 5 | 4 | 13 | 6 |
| Cement1:Ex1 75:25 | 15 | 11 | 8 | 4 | 3 | 10 | 5 |
| Cement1:Ex1 50:50 | 16 | 12 | 8 | 4 | 3 | 12 | 4 |
| Cement1:Ex1 25:75 | 12 | 9 | 6 | 4 | 3 | 9 | 3 |
| Cement1:Ex1 5:95 | 11 | 8 | 5 | 3 | 2 | 9 | 2 |
| OBM1:Cement1 95:5 | 16 | 13 | 11 | 7 | 6 | 7 | 9 |
| OBM1:Cement1 75:25 | 30 | 24 | 17 | 9 | 8 | 19 | 11 |
| OBM1:Cement1 50:50 | 38 | 30 | 23 | 13 | 12 | 22 | 16 |
| OBM1:Cement1 25:75 | 31 | 25 | 17 | 11 | 10 | 21 | 11 |
| OBM1:Cement1 5:95 | 30 | 22 | 17 | 11 | 10 | 19 | 11 |
| OBM1:Ex1:Cement1 25:50:25 | 15 | 12 | 9 | 4 | 3 | 9 | 6 |

The compatibility test results of Table 2 show favorable results spacer fluid composition Example 1 in all ratios with OBM 1 and Cement 1. The mixtures between OBM 1 and the water-based cement slurry Cement 1 reveal incompatibility virtually across all blending ratios—viscosity profile numbers greater than the viscosity profile values for OBM 1 and Cement 1 base materials. Example 1 shows excellent compatibility at all ratios with Cement 1. Example 1 has good compatibility with OBM 1, showing a minor viscosity "bump" occurring around the 75:25 and 50:50 OBM:spacer fluid ratio. The highest Yield Point for either the water-based cement slurry or the oil-based mud with the spacer fluid composition Example 1 at any ratio is 10 $lb_m/100\ ft^2$.

The 25:50:25 OBM1:Example1:Cement1 shows extremely good spacer fluid compatibility during heavy contamination with both incompatible fluids. This demonstrates that Example 1 can maintain an easy-to-pump viscosity profile even under heavy adjacent fluid contamination with both OBM 1 and Cement 1 present. Comparatively, the viscosity profile of the 50:50 OBM 1:Cement 1 mixture in Table 2 demonstrates a significantly higher viscosity profile.

One potential side effect of low-level contamination of the water-based cement slurry is a shortening of its thickening time. The thickening time is the time in which it takes the water-based cement slurry to reach 100 Bearden units of consistency (BC), which is a dimensionless value. At values higher than 100 Bearden units, cement slurries are not pumpable.

Table 3 shows the results of modification to cement slurry thickening time per Section 16.4 of API RP 10B-2 for uncontaminated Cement 1 and mixtures of Example 1 and Cement 1.

TABLE 3

Thickening Time test results for Cement 1 and Cement 1:Example 1 mixtures.
Thickening Time Tests for Cement 1 with Example 1

| | Properties | |
|---|---|---|
| Fluid Mixtures | Thickening Time Reading Minutes | Bearden Units BC |
| Cement1 | 310 | 100 |
| Cement1:Ex1 95:5 | 430 | 100 |
| Cement1:Ex1 75:25 | 480 | 12 |

The results in Table 3 show that thickening time increases with contamination of Cement 1 with amounts of Example 1. The results indicate that a minor amount of Example 1 contamination into Cement 1 does not cause Cement 1 to set up prematurely and become unpumpable.

The compressive strength of the uncontaminated cement and spacer fluid contaminated admixtures are in Table 4. The compressive strength tests use an ultrasonic cement analyzer. The procedures of Clause 8 (Non-destructive Sonic Testing of Cement) as well as Chapter 16.5 of API RP 10B-2 guide the preparation and testing of the water-based cement slurry and the admixtures using the ultrasonic cement analyzer.

TABLE 4

Sonic Compressive Strength Tests between Cement 1 and Cement 1:Example 1 mixtures.
Sonic Compressive Strength Tests for Cement with Example 1

| | Properties | | |
|---|---|---|---|
| Fluid Mixtures | Time to 50 Psi Minutes | Time to 500 Psi Minutes | Compressive Strength @ 24 hours Psi |
| Cement1 | 416 | 728 | 888 |
| Cement1:Ex1 95:5 | 456 | 916 | 705 |
| Cement1:Ex1 75:25 | 1380 | +1440 | 67 |

The results in Table 4 confirm a lengthening of the time to harden into solid cement suggested by the results given in Table 3.

Table 5 shows the results of modification to cement slurry fluid loss per Clause 10 and Section 16.6 of API RP 10B-2 for uncontaminated Cement 1 and mixtures of Example 1 and Cement 1.

TABLE 5

Fluid Loss Tests between Cement 1 and Cement 1:Example 1 mixtures.
Fluid Loss Tests for Cement with Example 1

| Fluid Mixtures | Properties Fluid Loss @ 30 Minutes Cm^3 |
|---|---|
| Cement1 | 146 |
| Cement1:Ex1 95:5 | 322 |
| Cement1:Ex1 75:25 | 248 |

Table 5 shows improvement in fluid loss for the Cement 1:Example 1 mixtures versus the uncontaminated Cement 1.

Example 2

Table 6 shows the results of compatibility testing per Section 16.3 of API RP 10B-2 (Rheology) for various mixtures of spacer fluid composition Example 2, water-based cement slurry Cement 2 and oil-based mud OBM 2.

TABLE 6

Compatibility tests between Example 2, OBM 2 and water-based cement slurry Cement 2.
Compatibility Testing of Example 2

| | Properties | | | | | | |
|---|---|---|---|---|---|---|---|
| | Viscometer Readings | | | | | Plastic Vis- | Yield Point lb/ |
| Fluid Mixtures | 300 cP | 200 cP | 100 cP | 6 cP | 3 cP | cosity cP | 100 ft^2 |
| Cement 2 - 101 PCF | 17 | 13 | 9 | 3 | 2 | 12 | 5 |
| Example 2 - 89 PCF | 11 | 8 | 6 | 3 | 2 | 7 | 4 |
| OBM 2 - 80 PCF | 26 | 22 | 16 | 8 | 6 | 15 | 12 |
| OBM2:Ex2 95:5 | 70 | 57 | 41 | 18 | 6 | 43 | 29 |
| OBM2:Ex2 75:25 | 120 | 97 | 70 | 27 | 23 | 75 | 49 |
| OBM2:Ex2 50:50 | 26 | 16 | 11 | 6 | 4 | 22 | 3 |
| OBM2:Ex2 25:75 | 10 | 7 | 5 | 3 | 2 | 7 | 2 |
| OBM2:Ex2 5:95 | 9 | 7 | 5 | 3 | 2 | 6 | 3 |
| Cement2:Ex2 95:5 | 17 | 14 | 9 | 4 | 3 | 12 | 6 |
| Cement2:Ex2 75:25 | 16 | 14 | 10 | 9 | 6 | 9 | 8 |
| Cement2:Ex2 50:50 | 15 | 13 | 9 | 7 | 6 | 9 | 7 |
| Cement2:Ex2 25:75 | 13 | 10 | 7 | 4 | 3 | 9 | 4 |
| Cement2:Ex2 5:95 | 12 | 10 | 7 | 4 | 3 | 7 | 5 |
| OBM2:Cement2 95:5 | 53 | 44 | 33 | 15 | 14 | 30 | 25 |
| OBM2:Cement2 75:25 | 46 | 33 | 24 | 11 | 14 | 33 | 13 |
| OBM2:Cement2 50:50 | 62 | 37 | 23 | 9 | 8 | 58 | 1 |
| OBM2:Cement2 25:75 | 46 | 33 | 24 | 11 | 9 | 33 | 13 |
| OBM2:Cement2 5:95 | 27 | 20 | 13 | 6 | 5 | 21 | 6 |
| OBM2:Ex2:Cement2 25:50:25 | 17 | 13 | 9 | 4 | 3 | 12 | 5 |

The compatibility test results of Table 6 show favorable results spacer fluid composition Example 2 in all ratios with OBM 2 and Cement 2. The mixtures between OBM 2 and the water-based cement slurry Cement 2 reveal incompatibility virtually across all blending ratios—viscosity profile numbers greater than the viscosity profile values for OBM 2 and Cement 2 base materials. Example 2 shows excellent compatibility at all ratios with Cement 2. Example 2 is generally compatible with OBM 2, although the viscosity "bump" for the 95:5 and 75:25 OBM:spacer fluid ratio is considered somewhat elevated. The highest Yield Point is 49 $lb_m/100\ ft^2$.

The 25:50:25 OBM 2:Example 2:Cement 2 shows extremely good spacer fluid compatibility during heavy contamination with both incompatible fluids. Comparatively, the viscosity profile of the 50:50 OBM 2:Cement 2 mixture in Table 6 demonstrates a significantly higher viscosity profile.

Example 3

Table 7 shows the results of compatibility testing per Section 16.3 of API RP 10B-2 (Rheology) for various mixtures of spacer fluid composition Example 3, water-based cement slurry Cement 3 and oil-based mud OBM 3.

TABLE 7

Compatibility tests between Example 3, OBM 3 and water-based cement slurry Cement 3.
Compatibility Testing of Example 3 with OBM and Cement

| | Properties | | | | | | |
|---|---|---|---|---|---|---|---|
| | Viscometer Readings | | | | | Plastic Vis- cos- | Yield Point lb/ |
| Fluid Mixtures | 300 cP | 200 cP | 100 cP | 6 cP | 3 cP | ity cP | 100 ft^2 |
| Cement 3 - 125 PCF | 151 | 103 | 50 | 19 | 15 | 151 | 0 |
| Example 3 - 102 PCF | 15 | 11 | 7 | 3 | 2 | 12 | 3 |
| OBM 3 - 81 PCF | 56 | 45 | 34 | 17 | 16 | 33 | 25 |
| OBM3:Ex3 95:5 | 79 | 63 | 45 | 21 | 19 | 51 | 30 |
| OBM3:Ex3 75:25 | 139 | 102 | 66 | 26 | 24 | 109 | 31 |
| OBM3:Ex3 50:50 | 29 | 20 | 13 | 7 | 6 | 24 | 5 |
| OBM3:Ex3 25:75 | 12 | 10 | 6 | 3 | 2 | 9 | 4 |
| OBM3:Ex3 5:95 | 17 | 13 | 9 | 3 | 2 | 12 | 5 |
| Cement3:Ex3 95:5 | 128 | 89 | 51 | 11 | 9 | 115 | 13 |
| Cement3:Ex3 75:25 | 49 | 34 | 22 | 8 | 6 | 40 | 9 |
| Cement3:Ex3 50:50 | 34 | 29 | 17 | 5 | 3 | 33 | 7 |
| Cement3:Ex3 25:75 | 40 | 32 | 24 | 15 | 13 | 24 | 17 |
| Cement3:Ex3 5:95 | 18 | 14 | 11 | 6 | 3 | 10 | 8 |
| OBM3:Cement3 95:5 | 90 | 74 | 54 | 24 | 22 | 54 | 39 |
| OBM3:Cement3 75:25 | +300 | 240 | 159 | 44 | 35 | ND | ND |
| OBM3:Cement3 50:50 | +300 | +300 | +300 | 220 | 160 | ND | ND |
| OBM3:Cement3 25:75 | 154 | 131 | 93 | 22 | 17 | 91 | 69 |
| OBM3:Cement3 5:95 | 141 | 100 | 61 | 17 | 14 | 120 | 22 |
| OBM3:Ex3:Cement3 25:50:25 | 29 | 23 | 14 | 5 | 4 | 22 | 7 |

The compatibility test results of Table 7 show favorable results spacer fluid composition Example 3 in all ratios with OBM 3 and Cement 3. The mixtures between OBM 3 and the water-based cement slurry Cement 3 reveal significant incompatibility virtually across all blending ratios. The latex/water based cement slurry and the OBM are virtually immobile at all mixture ratios. Example 3 shows excellent compatibility at all ratios with Cement 3. Example 3 is generally compatible with OBM 3, although the viscosity "bump" for the 95:5 and 75:25 OBM:spacer fluid ratio is considered somewhat elevated. The highest Yield Point is 31 $lb_m/100\ ft^2$.

The 25:50:25 OBM 2:Example 2:Cement 2 shows excellent spacer fluid compatibility during heavy contamination with both incompatible fluids. Comparatively, the viscosity profile of the 50:50 OBM 3:Cement 3 mixture in Table 7 demonstrates appears virtually unpumpable.

Table 8 shows the results of modification to cement slurry thickening time per Section 16.4 of API RP 10B-2 for uncontaminated Cement 3 and mixtures of Example 3 and Cement 3.

TABLE 8

Thickening Time test results for Cement 3 and Cement 3:Example 3 mixtures.
Thickening Time Tests for Cement with Example 3

| | Properties | |
|---|---|---|
| Fluid Mixtures | Thickening Time Reading Minutes | Bearden Units BC |
| Cement 3 | 341 | 100 |
| Cement3:Ex3 95:5 | 390 | 100 |
| Cement3:Ex3 75:25 | 390 | 14 |

The results in Table 3 show that with a minor amount of contamination (95:5 cement slurry/spacer fluid) that the time to reach an equivalent Bearden units as the uncontaminated slurry is approximately 14% longer.

The compressive strength of the uncontaminated cement and spacer fluid contaminated admixtures are in Table 9. The compressive strength tests use an ultrasonic cement analyzer. The procedures of Clause 8 (Non-destructive Sonic Testing of Cement) as well as Chapter 16.5 of API RP 10B-2 guide the preparation and testing of the water-based cement slurry and the admixtures using the ultrasonic cement analyzer.

TABLE 9

Sonic Compressive Strength Tests between Cement 3 and Cement 3:Example 3 mixtures.
Sonic Compressive Strength Tests for Cement with Example 3

| | Properties | | |
|---|---|---|---|
| Fluid Mixtures | Time to 50 psi Minutes | Time to 500 psi Minutes | Compressive Strength @ 24 hours Psi |
| Cement 3 | 385 | 421 | 2393 |
| Cement3:Ex3 95:5 | 319 | 365 | 2969 |
| Cement3:Ex3 75:25 | 476 | 515 | 1056 |

The results in Table 9 show that a minor amount of contamination (95:5 Cement 3: Example 3) causes the cement slurry to harden into a solid cement that is approximately 25% stronger than the uncontaminated. Cement 3. The minor amount of contamination of spacer fluid Example 3 in cement slurry Cement 3 also causes the cement slurry to reach the 50 and 500 psi strength measuring points 18% and 12% faster than uncontaminated cement, respectively.

Table 10 shows the results of modification to cement slurry fluid loss per Clause 10 and Section 16.6 of API RP 10B-2 for uncontaminated Cement 3 and mixtures of Example 3 and Cement 3.

TABLE 10

Fluid Loss Tests between Cement 3 and Cement 3:Example 3 mixtures.
Fluid Loss Tests for Cement with Example 3

| Fluid Mixtures | Properties Fluid Loss @ 30 Minutes Cm^3 |
|---|---|
| Cement | 65 |
| Cement:Ex. 3 95:5 | 46 |
| Cement:Ex. 3 75:25 | 69 |

As with the other compatibility tests, the slightly contaminated Cement 1: Example 1 (95:5) mixture shows better performance than uncontaminated Cement 3 through about 30% reduction in fluid loss after 30 minutes. The results in Table 10 show good compatibility between Example 3 spacer fluid and Cement 3 and, in fact, improved performance in the presence of a minor amount of Example 3 spacer fluid.

What is claimed is:

1. A method for introducing and positioning a first fluid in a well bore annulus of a well bore containing a second fluid, where the well bore is located beneath a surface, is defined by a well bore wall extending from a surface underground, fluidly couples to a first fluid conduit and a second fluid conduit, and contains at least a portion of a tubular having an exterior surface;

where the first fluid conduit and the second fluid conduit each are separately fluidly connected with the surface and are operable to convey fluids between the well bore and the surface; and where the well bore annulus is defined as a portion of the well bore between the tubular exterior surface in the well bore and the well bore wall;

the method for introducing and positioning comprising the steps of:

formulating a spacer fluid composition, such that a measured viscosity of a mixture of the first fluid and the spacer fluid composition at a first ratio of the first fluid to the spacer fluid composition is less than a measured viscosity of a mixture of the second fluid and the first fluid at a second ratio of the second fluid to the first fluid, where the first ratio and second ratio are substantially the same, and where the second fluid is an oil-based fluid and the first fluid is a water-based cement slurry;

formulating the spacer fluid composition, such that a measured viscosity of a mixture of the second fluid and the spacer fluid composition at a third ratio of the second fluid to the spacer fluid composition is less than a measured viscosity of a mixture of the second fluid and the first fluid at the second ratio of the second fluid to the first fluid, where the third ratio is substantially the same as the first ratio and the second ratio, where a measured viscosity of the spacer fluid composition is less than a measured viscosity of the first fluid and a measured viscosity of the second fluid, and where the spacer fluid composition maintains compatibility with both the first fluid and the second fluid during heavy contamination when the volume percent of the spacer fluid composition is about 50% by volume in a mixture comprising the spacer fluid composition, the first fluid at about 25% by volume, and the second fluid at about 25% by volume;

introducing into the well bore through the first fluid conduit an amount of the spacer fluid composition such that the spacer fluid composition fluidly couples to the second fluid in the well bore, where the spacer fluid composition comprises a chemically modified tannin at a concentration of about 8.5 pounds per barrel, barite at a concentration of about 377 pounds per barrel, a silicone liquid at a concentration of about 0.1 gallons per barrel, and an ethoxylated alcohol at a concentration of about 1.9 pounds per barrel in an aqueous base fluid and where the spacer fluid composition is compatible with both the first fluid and the second fluid;

introducing into the well bore through the first fluid conduit an amount of the first fluid such that the first fluid fluidly contacts the spacer fluid composition in the well bore and the first fluid does not contact the second fluid, where the first fluid and the second fluid are not compatible with one another; and positioning a portion of the first fluid in the well bore annulus, the portion of the first fluid positioned in the wellbore annulus mixing with the spacer fluid composition up to a volume ratio of about 95:5 first fluid to spacer fluid composition, such that the water-based cement slurry compressive strength upon setting to a solid cement is increased by at least about 25% at about 24 hours compared to the water-based cement slurry alone, where during each introduction step an amount of the fluid in the well bore substantially equivalent to the amount of fluid introduced passes from the well bore through the second fluid conduit, and where during each introduction step the fluid in the well bore flows non-turbulently through the well bore annulus.

2. The method of claim 1 where the tubular having the exterior surface is fluidly connected with the surface and is the first fluid conduit.

3. The method of claim 1 where the tubular having the exterior surface is fluidly connected with the surface and is the second fluid conduit.

4. The method of claim 1 where the amount of spacer fluid composition introduced displaces the entire amount of the fluid in the well bore from the well bore annulus.

5. The method of claim 1 where the combined amount of spacer fluid composition and the first fluid introduced displaces the entire amount of fluid in the well bore from the well bore annulus.

6. The method of claim 1 where the method further comprises the step of introducing into the well bore an amount of a third fluid such that the third fluid contacts the first fluid in the well bore, where the third fluid is compatible with the first fluid.

7. The method of claim 6 where the third fluid is selected from the group consisting of fresh waters, salt waters, brines, spacer fluid composition and combinations thereof.

8. The method of claim 7 where the third fluid is a second spacer fluid composition having a different composition than the spacer fluid composition introduced between the first fluid and the second fluid.

9. A method for fluidly isolating a portion of a well bore containing an oil-based fluid using a water-based cement slurry, where the well bore is located beneath a surface, is defined by a well bore wall extending from a surface underground, fluidly couples to a first fluid conduit and a second fluid conduit, and contains at least a portion of a tubular having an exterior surface;

where the first fluid conduit and the second fluid conduit each are separately fluidly connected with the surface and are operable to convey fluids between the well bore and the surface; and where a well bore annulus is defined as a portion of the well bore between the tubular exterior surface in the well bore and the well bore wall;

the method for fluidly isolating the portion of the well bore comprising the steps of:

formulating a spacer fluid composition, such that a measured viscosity of a mixture of the spacer fluid composition and the water-based cement slurry at a first ratio of the water-based cement slurry to the spacer fluid composition is less than a measured viscosity of a mixture of the water-based cement slurry and the oil-based fluid at a second ratio of the oil-based fluid to the water-based cement slurry, where the first ratio and second ratio are substantially the same;

formulating the spacer fluid composition, such that a measured viscosity of a mixture of the spacer fluid composition and the oil-based fluid at a third ratio of the oil-based fluid to the spacer fluid composition is less than a measured viscosity of a mixture of the water-based cement slurry and the oil-based fluid at the second ratio, where the third ratio is substantially the same as the first ratio and the second ratio, where a measured viscosity of the spacer fluid composition is less than a measured viscosity of the oil-based fluid and a measured viscosity of the water-based cement slurry, and where the spacer fluid composition maintains compatibility with both the oil-based fluid and the water-based cement slurry during heavy contamination when the volume percent of the spacer fluid composition is about 50% by volume in a mixture comprising the spacer fluid composition, the water-based cement slurry at about 25% by volume, and the oil-based fluid at about 25% by volume;

introducing into the well bore through the first fluid conduit an amount of the spacer fluid composition such that the spacer fluid composition fluidly couples to the oil-based fluid in the well bore, where the spacer fluid composition comprises a chemically modified tannin at a concentration of about 8.5 pounds per barrel, barite at a concentration of about 377 pounds per barrel, a silicone liquid at a concentration of about 0.1 gallons per barrel, and an ethoxylated alcohol at a concentration of about 1.9 pounds per barrel in an aqueous base fluid and is compatible with both the oil-based fluid in the well bore and the water-based cement slurry;

positioning the spacer fluid composition in the well bore annulus such that the spacer fluid composition fluidly contacts the portion of the tubular exterior surface and a portion of the well bore wall of the well bore annulus, the fluid contact making both surfaces water-wet;

introducing into the well bore through the first fluid conduit an amount of the water-based cement slurry such that the water-based cement slurry fluidly contacts the spacer fluid composition in the well bore and such that the oil-based fluid does not fluidly contact the water-based cement slurry, where the water-based cement slurry is operable to cure into a solid cement material at well bore conditions with up to about 5% volume of the spacer fluid composition in the water-based cement slurry, such that the water-based cement slurry compressive strength upon setting to the solid cement material is increased by at least about 25% at about 24 hours compared to the water-based cement slurry alone;

positioning the water-based cement slurry in the well bore annulus such that the water-based cement slurry fluidly contacts the water-wetted surfaces of the tubular exterior surface and the well bore wall; and maintaining the water-based cement slurry in the well bore annulus until the water-based cement slurry adheres to the water-wetted portions of the tubular exterior surface and the well bore wall and cures into the solid cement material, isolating a portion of the well bore from well bore circulation, where the oil-based fluid and the water-based cement slurry are not compatible with one another, where during each introduction step an amount of the fluid in the well bore substantially equivalent to the amount of fluid introduced passes from the well bore through the second fluid conduit, and where during each introduction step the fluid in the well bore flows non-turbulently through the well bore annulus.

10. The method of claim 9 where the amount of spacer fluid composition introduced displaces the entire amount of well bore fluid from the well bore annulus.

11. The method of claim 9 where the combined amount of spacer fluid composition and water-based cement slurry introduced displaces the entire amount of well bore fluid from the well bore annulus.

12. The method of claim 9 where the amount of water-based cement slurry introduced displaces the entire amount of well bore fluid from the well bore annulus.

13. The method of claim 9 where the water-based cement slurry has a density in a range of from about 101 pounds per cubic foot to about 125 pounds per cubic foot.

14. The method of claim 13 where the water-based cement slurry is a water-based latex cement slurry.

15. The method of claim 9 where the oil-based fluid has a density in a range of from about 56 pounds per cubic foot to about 81 pounds per cubic foot.

16. A method for treating a well bore annulus using a spacer fluid composition in preparation for introducing a water-based cement slurry, where the well bore is located beneath a surface, contains a fluid, is defined by a well bore wall extending from a surface underground, fluidly couples to a first fluid conduit and a second fluid conduit, and contains at least a portion of a tubular having an exterior surface;

where the first fluid conduit and the second fluid conduit each are separately fluidly connected with the surface and are operable to convey fluids between the well bore and the surface; and where a well bore annulus is defined as a portion of the well bore between the tubular exterior surface in the well bore and the well bore wall;

the method for treating the well bore annulus comprising the steps of:

formulating a spacer fluid composition, such that a measured viscosity of a mixture of the spacer fluid composition and the water-based cement slurry at a first ratio of the water-based cement slurry to the spacer fluid composition is less than a measured viscosity of a mixture of the water-based cement slurry and the fluid at a second ratio of the fluid to the water-based cement slurry, where the first ratio and second ratio are substantially the same;

formulating the spacer fluid composition, such that a measured viscosity of a mixture of the spacer fluid composition and the fluid at a third ratio of the fluid to the spacer fluid composition is less than a measured viscosity of a mixture of the water-based cement slurry and the fluid at the second ratio, where the third ratio is substantially the same as the first ratio and the second ratio, where a measured viscosity of the spacer fluid composition is less than a measured viscosity of the fluid and a measured viscosity of the water-based cement slurry, and where the spacer fluid composition maintains compatibility with both the fluid and the water-based cement slurry during heavy contamination when the volume percent of the spacer fluid composition is about 50% by volume in a mixture comprising the spacer fluid composition, the fluid at about 25% by volume, and the water-based cement slurry at about 25% by volume;

introducing into the well bore through the first fluid conduit an amount of the spacer fluid composition, where the spacer fluid composition comprises a chemically modified tannin at a concentration of about 8.5 pounds per barrel, barite at a concentration of about 377 pounds per barrel, a silicone liquid at a concentration of about 0.1 gallons per barrel, and an ethoxylated alcohol at a concentration of about 1.9 pounds per barrel in an aqueous base fluid and is compatible with both the fluid in the well bore and the water-based cement slurry, and where during the introduction an amount of the fluid in the well bore substantially equivalent to the amount of the introduced spacer fluid composition passes from the well bore through the second fluid conduit; and positioning the spacer fluid composition in the well bore annulus such that the spacer fluid composition fluidly contacts the portion of the tubular exterior surface and a portion of the well bore wall of the well bore annulus, the fluid contact making both surfaces water-wet and the spacer fluid composition mixing with the water-based cement slurry up to a volume ratio of about 95:5 water-based cement slurry to spacer fluid composition, such that the water-based cement slurry compressive strength upon setting to a solid cement is increased by at least about 25% at about 24 hours compared to the water-based cement slurry alone, where during the introduction step the fluid in the well bore flows non-turbulently through the well bore annulus.

* * * * *